(12) United States Patent
Rousseau et al.

(10) Patent No.: US 8,448,744 B2
(45) Date of Patent: May 28, 2013

(54) SOUNDPROOFING DEVICE FOR THE PASSENGER COMPARTMENT OF A VEHICLE, IN PARTICULAR OF AN AUTOMOBILE

(75) Inventors: Frederic Rousseau, Ponthevrard (FR); Stephan Philip, Gif sur Yvette (FR); Laurent Mougnard, Saint Sulpice sur Risle (FR); Olivier Chary, Courbepine (FR)

(73) Assignees: Peugeot Citroen Automobiles SA (FR); TRAMICO (FR)

( * ) Notice: Subject to any disclaimer, the term of this patent is extended or adjusted under 35 U.S.C. 154(b) by 0 days.

(21) Appl. No.: 13/392,699

(22) PCT Filed: Aug. 30, 2010

(86) PCT No.: PCT/FR2010/051797
§ 371 (c)(1),
(2), (4) Date: Mar. 26, 2012

(87) PCT Pub. No.: WO2011/023919
PCT Pub. Date: Mar. 3, 2011

(65) Prior Publication Data
US 2012/0175185 A1   Jul. 12, 2012

(30) Foreign Application Priority Data
Aug. 31, 2009   (FR) .................................... 09 55928

(51) Int. Cl.
*E04B 1/82* (2006.01)
(52) U.S. Cl.
USPC ............................ 181/290; 181/284; 181/286

(58) Field of Classification Search
USPC ................................................. 181/290, 284
See application file for complete search history.

(56) References Cited

U.S. PATENT DOCUMENTS 6,524,691 B2 * 2/2003 Sugawara et al. .......... 428/292.4
7,263,028 B2 * 8/2007 Thomas et al. .................... 367/1
(Continued)

FOREIGN PATENT DOCUMENTS

| DE | 4103039 A1 | 8/1992 |
| DE | 202006008449 U1 | 8/2006 |
| EP | 2052828 A1 | 4/2009 |

(Continued)

OTHER PUBLICATIONS

International Search Report, corresponding to PCT/FR2010/051797, mailed Jan. 18, 2011, with translation.

*Primary Examiner* — Forrest M Phillips
(74) *Attorney, Agent, or Firm* — Polster, Lieder, Woodruff & Lucchesi, L.C.

(57) ABSTRACT

The invention relates to a soundproofing device for the passenger compartment of a vehicle (10), to be positioned between a sheet métal panel of the vehicle bodywork (12) and an inner trimming panel (14). The device comprises a polymer foam plate (20) impregnated with a mixture of an inorganic filler and an organic binder, the foam plate (20) being shaped so as to be in close contact with the sheet métal panel of the bodywork (12) and with the inner trimming panel (14). The invention further relates to an inner trimming System for the passenger compartment of a vehicle, comprising an inner trimming panel (14) for covering a sheet métal panel of the vehicle bodywork (12) and such a device. The invention further relates to a vehicle provided with such a System. The invention can be used in automobiles.

15 Claims, 2 Drawing Sheets

| U.S. PATENT DOCUMENTS | | | | | FOREIGN PATENT DOCUMENTS | | |
|---|---|---|---|---|---|---|---|
| 2006/0141240 | A1* | 6/2006 | Ota et al. ................... 428/319.3 | FR | 2733933 | A1 | 11/1996 |
| 2007/0160799 | A1* | 7/2007 | Nguyen .......................... 428/74 | JP | 57194163 | A | 11/1982 |
| 2009/0107059 | A1* | 4/2009 | Kipp et al. ...................... 52/144 | JP | 58177745 | A | 10/1983 |
| 2010/0230206 | A1* | 9/2010 | Tinianov et al. .............. 181/286 | | | | |
| 2011/0108359 | A1* | 5/2011 | Nishimura et al. ........... 181/290 | | | | |

* cited by examiner

SOUNDPROOFING DEVICE FOR THE PASSENGER COMPARTMENT OF A VEHICLE, IN PARTICULAR OF AN AUTOMOBILE

CROSS-REFERENCE TO RELATED APPLICATIONS

This application is the US National stage, under 35 U.S.C. §371, of International App. No. PCT/FR2010/051797 which was filed on Aug. 30, 2010 and claims priority to French Application No. 0955928 which was filed on Aug. 31, 2009.

BACKGROUND OF THE INVENTION

The present invention relates to a soundproofing device for the passenger compartment of a vehicle, in particular an automobile.

More particularly, the invention relates to a device intended to be placed between a sheet metal panel of the vehicle body and an interior trim panel.

This type of known device, intended for the roof of a vehicle, is a tar plate which is glued to the sheet metal roof panel. Such tar plates, which are glued to an area of the sheet metal panel, make the roof stiffer, and has as disadvantages: cost, significant mass, glue which can be harmful to the health of the operators gluing the plate in the vehicle assembly plant, and a gluing method which is often constraining. The constraints tainting the gluing process result from the fact that the gluing is done inside the vehicle, which on the one hand may require the operators to work with raised arms, even blind, or on the other hand requires the use of expensive robots.

BRIEF SUMMARY

The specific goal of the present invention is to remedy the disadvantages of the prior art.

To this end, a soundproofing device is provided for the passenger compartment of a vehicle, in particular an automobile, which is intended to be placed between a sheet metal panel of the vehicle body and an interior trim panel. The soundproofing device comprises a polymer foam pad impregnated with a mixture of inorganic filler and organic binder. The foam pad is shaped in such manner as to make intimate contact with the sheet metal body panel and the interior trim panel.

In addition, in various embodiments, the soundproofing device can have one or more of the following provisions:
the polymer of the foam pad is polyurethane;
the organic binder of the mixture is acrylic based;
the inorganic filler comprises aluminum silicate;
the inorganic filler is chalk;
the mixture is 50% by weight inorganic filler and 50% by weight organic binder mass or 60% by weight inorganic filler and 40% by weight organic binder;
the density of the foam pad is approximately 18 kg/m3;
the thickness of the foam pad is between 5 mm and 15 mm.

Also disclosed is an interior trim system for the passenger compartment of a vehicle, in particular an automobile, comprising an interior trim panel used to cover a sheet metal panel of the vehicle body. The system comprises a soundproofing device in which the foam pad is intimately connected with the upper surface of the interior trim panel in such a manner that the foam pad can be placed between the interior trim panel and the sheet metal body panel, and in intimate contact with body panel.

In one embodiment of this system, the foam pad is glued to the interior trim panel.

In accordance with another aspect of the systems, a vehicle, in particular an automobile, comprises a body with a roof having a sheet metal panel and a passenger compartment in which an interior trim panel for the roof is installed. In the vehicle, the interior trim panel is a panel of the system in which the soundproofing device is comprised of a foam pad and which is placed between the sheet metal roof panel and the interior trim panel of the roof. The foam pad is in contact with at least one specific area of the sheet metal roof panel and with at least one specific area of the interior trim panel of the roof.

In this vehicle, the foam is preloaded between the specific areas of the sheet metal roof panel and the interior trim panel of the roof.

BRIEF DESCRIPTION OF THE SEVERAL VIEWS OF THE DRAWINGS

Other goals, characteristics and advantages of the system will become clear in view of the following description of one of the embodiments, which given as a non-limiting example, with reference to the attached drawings in which.

In the different figures, the same references designate identical or similar elements.

DETAILED DESCRIPTION

Figure 1:
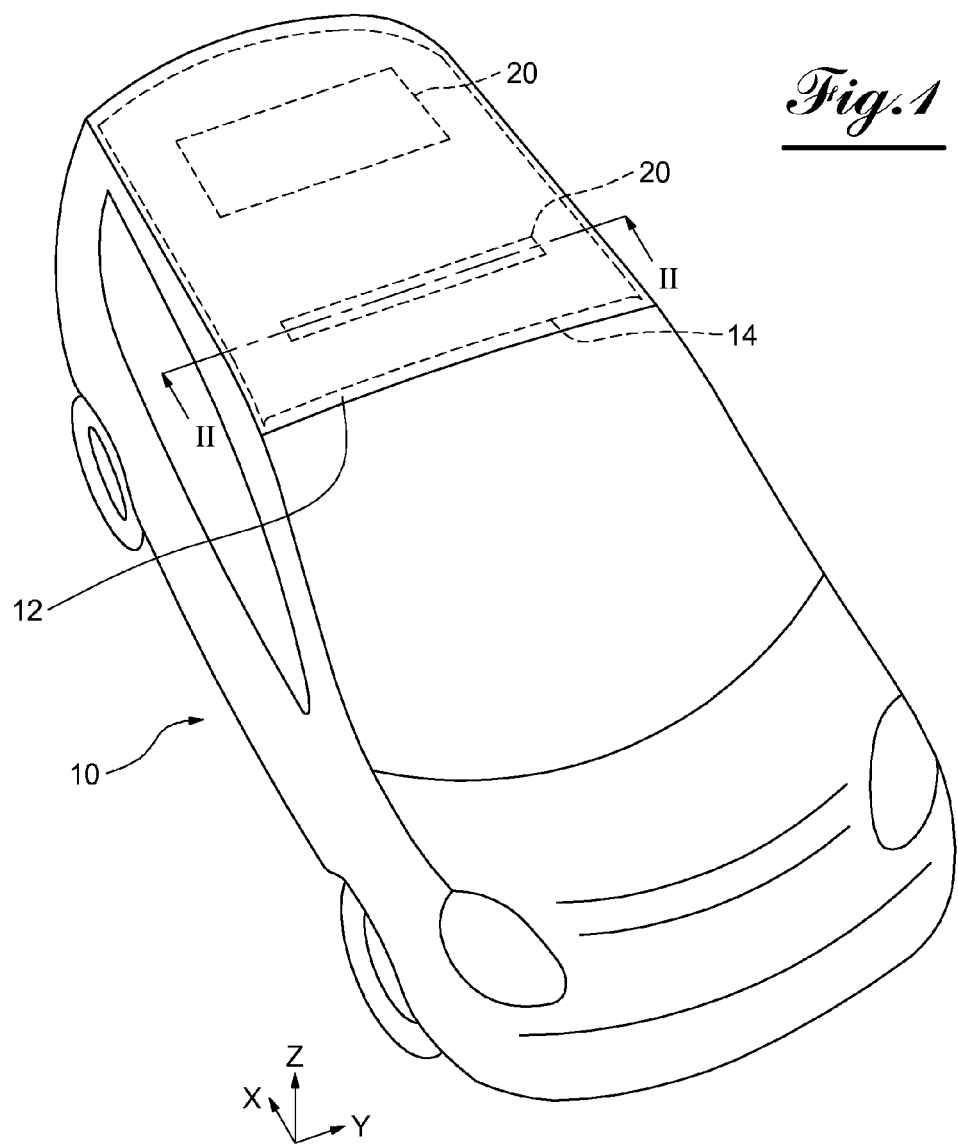
FIG. 1 is a schematic view in perspective of a vehicle equipped with a soundproofing device.
Figure 2:
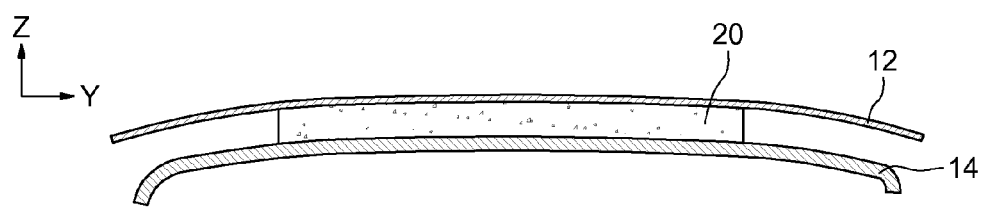
FIG. 2 is a schematic view of a cross-section taken along line II-II of FIG. 1.

In the following description, the X direction is the longitudinal direction corresponding with the movement axis of the vehicle, the Y direction is the transverse direction, the Z direction is vertical, according to a standard orthogonal reference.

Relative to the figures, reference 10 designates a vehicle, the body of which is provided in a traditional manner with a roof comprising a sheet metal panel 12 which is generally horizontal. As is known, the sheet metal roof panel 12 extends transversally between longitudinal rails and longitudinally between a front upper cross beam and a rear upper cross beam. The panel 12 is supported by the rails, the beams and an intermediate cross beam, approximately midway between the front and rear cross beams. The cross beams and rails of the body structure are not shown in the figures.

The vehicle comprises an interior trim panel 14 which covers the roof of the passenger compartment in order to hide the sheet metal roof panel 12 from the view of the occupants of the compartment. The interior trim panel 14 is mounted in a traditional manner to the structure of the vehicle body.

Vehicle 10 comprises two soundproofing devices 20, placed between the sheet metal body panel 12 and the interior trim panel 14. The soundproofing devices 20 are placed in areas which are likely to move when they are subjected to vibrational excitation or mechanical excitation, for instance, when the vehicle is washed or during paint work.

Each of the soundproofing devices 20 is a foam pad with acoustic properties. The pad is substantially flat and in contact with the sheet metal body panel 12 and the interior trim panel 14. The flat contact allows for sufficiently intimate contact in order to transmit vibrations or forces between the foam pad and the panels.

The thickness of the foam pad varies between 5 mm and 15 mm according to the vehicle model to be acoustically treated. Preferably, the thickness of the foam pad is within a thickness range of 5 mm to 8 mm. In the embodiment shown, the thickness of the foam pad is 5 mm.

The soundproofing foam pad is comprised of a polymer core, which is homogenously impregnated with a mixture containing an inorganic filler and an organic binder.

The organic binder is acrylic, and specifically polyacrylonitrile.

The core polymer is polyurethane in the form of low density foam, for example, with density approximately equal to 18 kg/m$^3$, or a density between 14 kg/m$^3$ and 22 kg/m$^3$. During the impregnation of the foam core with the mixture, for example by dunking it in a bath with the mixture, the mixture more or less fills the pores of the foam, and the organic binder ensures the cohesion of the inorganic filler with the foam core.

The acrylic base and the inorganic filler represent, respectively, forty and sixty percent of the mixture by weight, which in turn represents eighty percent of the volume or eighty percent of the final product by weight. The polyurethane foam, constituting the core of the foam pad, represents twenty percent of the final product. In a variant, the mixture consists of fifty percent inorganic filler by weight and fifty percent organic binder by weight.

In the described embodiment, representing an implementation example which has given good results in soundproofing tests with various vehicles, the inorganic filler is chalk, in other words mainly limestone, $CaCO_3$, and aluminum silicate, normally called clay. In another implementation example, the inorganic filler is clay.

After impregnation with the mixture, the soundproofing foam pad is viscoelastic and feels sticky to the touch, but is not adhesive. Thus, the pad needs to be glued in order to be mounted in the vehicle between the sheet metal body panel 12 and the interior trim panel 14. The foam pad is glued against the top face of the interior trim panel 14, before the interior trim panel 14 is assembled in the passenger compartment of the vehicle. The gluing takes place in the automobile assembly plant or in the plant of the original equipment manufacturer supplying the interior trim panel to the automobile manufacturer.

Each of these soundproofing foam pads 20 is glued in a specific area of the interior trim roof panel, opposite a specific area of the roof which needs to be treated acoustically, the areas varying depending on the model of the vehicle to be acoustically treated.

In the implementation mode shown in FIG. 1, the foam pads 20 have a rectangular shape. A first foam pad 20, with dimensions 400×100 mm, is placed midway between the front upper cross beam and the middle cross beam of the roof. A second foam pad 20, with dimensions 400×400 mm, is placed between the rear upper cross beam and the middle cross beam of the roof. In a variant, other forms, other dimensions, and other locations of the soundproofing foam pad, or several soundproofing foam pads, can be provided.

The interior trim panel 14 equipped with its soundproofing foam pad 20 constitutes an interior trim system which is mounted in the passenger compartment of the vehicle in such manner that the soundproofing foam pad 20 is preloaded, by compressing it, for example, 2 mm between the sheet metal body panel 12 and the interior trim panel 14.

Figure 3:
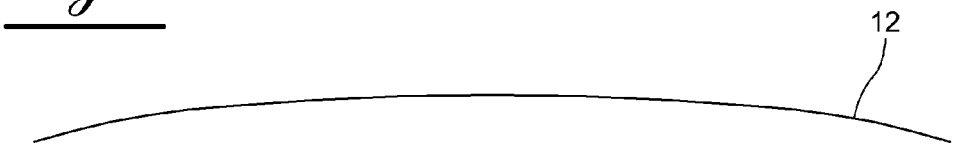
FIGS. 3 and 4 are views schematically showing a sheet metal plate of a vehicle roof at rest and when vibrating, respectively.
Figure 4:
Figure 5:
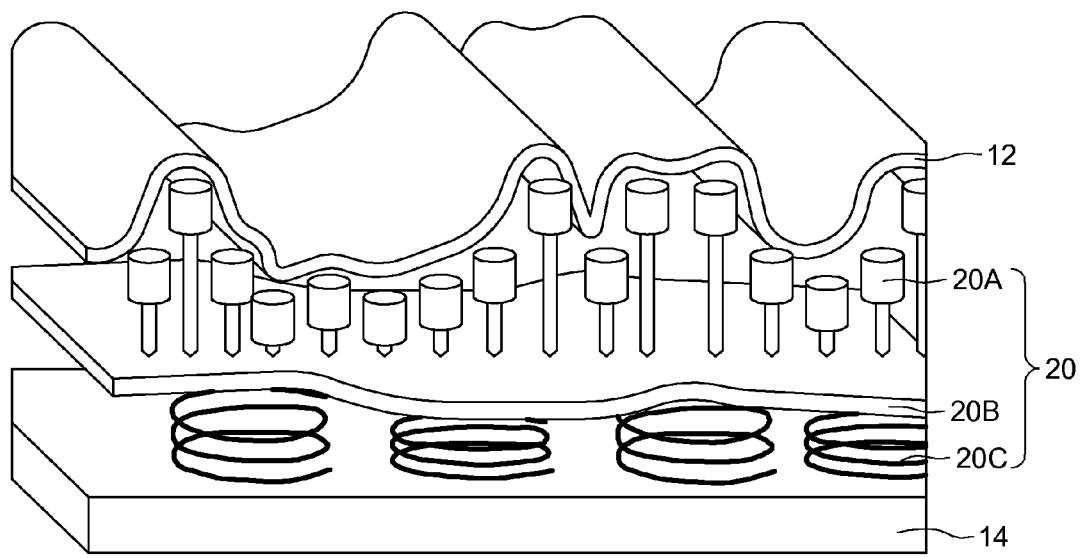
FIG. 5 is a schematic view in perspective showing the working principle of the soundproofing device when vibrating.

The working principle of the soundproofing device and of the interior trim system is illustrated in FIGS. 3 to 5.

In FIG. 3, the sheet metal roof panel 12 is shown at rest and in FIG. 4 it is shown while vibrating. The panel 12 is shown with its central part between the rails and the cross beams of the body structure deformed in undulating manner.

The foam pad 20 reduces the deformation of the sheet metal roof panel 12 when it vibrates, in order to reduce the acoustic emissions of the panel.

The soundproofing foam pad 20 which is preloaded between the sheet metal body panel 12 and the interior trim panel 14. It works like a plurality of small jacks, which in essence absorb the vibrations of the sheet metal body panel 12. FIG. 5 illustrates, in a didactic manner, the working principle of the foam pad 20, showing the function of its components, knowing that the foam pad 20 is overall macroscopically homogenous and is not layered.

In the soundproofing foam pad 20, the polyurethane foam core behaves like springs 20C which provide the preload, and give rigidity to the soundproofing device. Represented as shock absorbers 20A in FIG. 5, the acrylic base of the impregnation mixture has a binding effect which holds the impregnated inorganic filler and dissipates energy by transforming through friction the mechanical energy of the vibrations into heat. Represented in the form of a layer 20B in FIG. 5, the impregnated inorganic filler has a mass effect which provides inertia to the soundproofing device and dissipates energy by transforming through friction the mechanical energy of the vibrations into heat.

Advantageously, the aforementioned interior trim system provides in an economical and effective manner:
  a reduction of the buzz noise of the roof due to driving noise such as percussion of the wheels against the pavement or vibrations of the powertrain group transmitted to the frame and the body of the vehicle,
  noise absorption such as rain noise on the sheet metal, and improvement of the roof indentation which has a stiffening effect on the roof and eliminates, for example, roof deformation when it is cleaned by forceful application of a sponge or during piercing prior to sheet metal repair and painting.

Advantageously, the system is more economical, lighter and more favorable in work station ergonomics and in fabrication time than the solutions which are normally used for soundproofing of the roof of automotive vehicles, namely tar plates glued against the sheet metal of the body, sheet metal type stiffeners, glued paperboard, and interior trim panels glued with adhesives posing health problems and installation difficulties.

The invention claimed is:

1. A soundproofing device for a passenger compartment of a vehicle, the vehicle comprising a sheet metal body panel and an interior trim panel; the soundproofing device comprising a foam pad made of a polymer impregnated with a mixture of inorganic filler and organic binder; the foam pad being sized such that it is in intimate contact with both the sheet metal body panel and the interior trim panel of the vehicle when the foam pad is positioned between the sheet metal body panel and the interior trim panel.

2. The soundproofing device of claim 1 wherein the foam pad defines an area that is smaller than an area defined by either the sheet metal body panel or the interior trim panel.

3. The soundproofing device according to the claim 1, wherein the polymer of the foam pad is polyurethane.

4. The soundproofing device according to claim 1, wherein the organic binder of the mixture is acrylic based.

5. The soundproofing device according to claim 1, wherein the inorganic filler comprises aluminum silicate.

6. The soundproofing device according to the claim 4, wherein the inorganic filler is chalk.

7. The soundproofing device according to claim 1, wherein the mixture comprises 50% by weight inorganic filler and 50% by weight organic binder.

8. The soundproofing device according to claim 1, wherein the mixture comprises 60% by weight inorganic filler and 40% by weight organic binder.

9. The soundproofing device according to claim 1, wherein the foam pad has a density of approximately 18 kg/m$^3$.

10. The soundproofing device according to claim 1, wherein the foam pad has a thickness of between 5 mm and 15 mm.

11. An interior trim system for a passenger compartment of a vehicle; the vehicle comprising an interior trim panel that covers a sheet metal body panel; wherein the interior trim system comprises a soundproofing device according to claim 1 in which the foam pad has a first surface which is intimately connected with a top surface of the interior trim panel and a second surface, opposite said first surface, which is intimately in contact with the sheet metal body panel; such that the foam pad is positioned between the interior trim panel and the sheet metal body panel, while being intimately in contact with both the interior trim panel and the sheet metal body panel.

12. The interior trim system according to the claim 11, wherein the foam pad is preloaded between the specific areas of the sheet metal roof panel and the interior trim panel of the roof.

13. The interior trim system according to the claim 11, wherein the foam pad is affixed to the interior trim panel.

14. A vehicle comprising a passenger compartment having a roof provided with a sheet metal panel and an interior trim panel, wherein the vehicle further includes the soundproofing device of claim 1 and wherein the foam pad is placed between the sheet metal roof panel and the interior trim panel to be in intimate contact with both the sheet metal roof panel and the interior trim panel while being in contact with at least one specific area of the sheet metal roof panel and with at least one specific area of the interior trim panel; the specific areas of the roof panel and the specific area of the interior trim panel being smaller than the overall area of the roof panel and the overall area of the interior trim panel, respectively.

15. The vehicle according to the claim 14, wherein the foam pad is preloaded between the specific areas of the sheet metal roof panel and the interior trim panel of the roof.

* * * * *